United States Patent Office 3,565,816
Patented Feb. 23, 1971

3,565,816
FLUORESCENT POLYCRYSTALLINE MATERIALS
Rudolf Wilhelm Heindl, Fontenay-aux-Roses, and Jean A. Loriers, Versailles, France, assignors to International Standard Electric Corporation, New York, N.Y., a corporation of Delaware
No Drawing. Filed Apr. 23, 1968, Ser. No. 723,613
Claims priority, application France, Apr. 28, 1967, 104,688
Int. Cl. C09k 1/44
U.S. Cl. 252—301.4
4 Claims

ABSTRACT OF THE DISCLOSURE

A mixture of magnesium and sodium vanadates activated with europium provides a high intensity of light emission in the red and yellow regions of the spectrum upon excitation by ultraviolet light.

BACKGROUND OF THE INVENTION

Field of the invention

The present invention concerns a new family of fluorescent materials constituted by mixed magnesium and sodium vanadates containing europium and by their derivatives.

Description of the prior art

The recent development of europium activated phosphor materials for color cathode ray tube screens has provided improved emission intensities, particularly in the red regions of the visible spectrum. U.S. Pat. No. 3,243,625, issued Mar. 29, 1966, and Nos. 3,360,674 and 3,360,675 issued Dec. 26, 1967 describe several such materials containing yttrium vanadate activated with europium, $YVO_4$:Eu. Research on other europium activated vanadates has resulted in the present novel luminescent material.

SUMMARY OF THE INVENTION

The object of the present invention is therefore to obtain new fluorescent compounds presenting a high light emission intensity.

Another object of the invention is to obtain new europium activated fluorescent compounds the light emission of which is concentrated in only one color.

The compounds of this family and the derivatives comprising up to two supplementary bodies are defined by the following empirical chemical formula:

$$(Mg_{1-y}Na_{1+y})_{1-x}Eu_x(VO_{4-y})_{1-z}F_yA_z \qquad A1)$$

In this formula, the coefficient $x$ has a value higher than zero and less than 0.1, the coefficients $y$, $z$ have values between 0 and 1, and the body A is a phosphate ion or an arsenate ion. All of these compounds present a red or yellow fluorescence upon excitation by a suitable source of ultra violet light. For some of them, the light emission is concentrated primarily in one color and its intensity presents a much higher value than that obtained with known compounds. Thus, for example, the material corresponding to the above chemical formula wherein $x=0.04$, $y=z=0$, gives an intensity of light emission equal to twice that given by the yttrium vanadate of the formula: 

present invention will become apparent by reference to the following description and examples.

DESCRIPTION OF THE PREFERRED EMBODIMENT

The preparation of the materials corresponding to the empirical chemical formula:

$$(Mg_{1-y}Na_{1+y})_{1-x}Eu_x(VO_{4-y})_{1-z}F_yA_z$$

is carried out by the process of high temperature reaction and comprises the following steps:

(1) Fine crushing of the compounds in proportions such that the final product corresponds to the chosen chemical formula;
(2) Intimate mixture of the different powders;
(3) Heating of the mixture in a platinum crucible, successively:

one hour at 600° C.
one hour at 650° C.
one hour at 700° C.

(4) Natural cooling of the crucible;
(5) Fine crushing of the product to obtain a fluorescent powder.

It has been established, during the trials, that fluorescent powders were obtained in the following range of values:

$x$ is greater than 0 and less than 0.1
$y$ has any value from 0 to 1, and
$z$ has any value from 0 to 1.

These values define three classes of products:

(1) Compounds comprising neither fluor, nor the body A ($y=z=0$): Among these, the resultant compound having the formula  under excitation by a suitable source of ultra violet radiation provides fluorescence in the red and yellow regions of about twice the intensity of that produced by the yttrium vanadate similarly doped with 4% of europium. Thus, if we take as a unit of light intensity, the intensity of the yellow in the yttrium vanadate, the relative intensity of the red in this same body is of 3, while the relative intensities of these two colors in the present compound are respectively of 2 and 6.

It will be noticed that, for these comparative measures, we have defined:

the color "red" as that corresponding to the sum of the light intensities emitted between 6,114 and 7,060 A.;
the color "yellow" as that corresponding to the sum of the light intensities emitted between 5,900 and 6,096 A.

(2) Compounds which do not comprise the body A ($z=0$): Among these, the compound obtained with $x=0.04$ and $y=0.2$ presents an important yellow fluorescence. The resultant formula is:

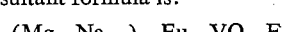

(3) Compounds comprising fluor and the body A: In these compounds, the body A is a phosphate or an arsenate ion which replaces a portion of the vanadate ion.
3.1 example of phosphated compound: the compound in which $A=PO_4$ and $x=0.04$, $y=0.2$, $z=0.2$ presents a high orange-red fluorescence having the formula Other objects, characteristics and advantages of the

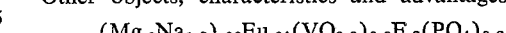

3.2 example of arsenate compound: the compound in which $A=AsO_4$ and $x=0.04$, $y=0.2$, $z=0.2$ presents a high red fluorescence (emission at about 6,250 A.) and practically no light emission in the yellow. The formula in this case is:

$$(Mg_{.8}Na_{1.2})_{.96}Eu_{.04}(VO_{3.8})_{0.8}F_{.2}AsO_4(.2)$$

As is well known, the products of the composition given by an empirical chemical formula such as above, are obtained by mixing the appropriate quantities of oxides or of carbonates containing the elements Mg, Na, V, Eu and of ammonium phosphates, arsenates and fluorides.

Thus, the arsenate compound defined in the last example is obtained by the mixture and the high temperature processing of the following bodies:

Magnesium oxide MgO: 0.768 mole or 30.95 g.
Sodium carbonate $Na_2CO_3$: 0.576 mole or 61.056 g.
Ammonium fluoride $NH_4F$: 0.2 mole or 7.398 g.
Vanadium oxide $V_2O_5$: 0.4 mole or 72.76 g.
Ammonium arsenate $(NH_4)_2AsO_4H$: 0.2 mole or 35.184 g.
Europium oxide $Eu_2O_3$: 0.02 mole or 7.04 g.

The vanadium oxide can be replaced by 0.8 mole, or 93.53 g. of ammonium metavanadate which has the advantage of being less expensive.

New polycrystalline fluorescent compounds in the red and yellow regions are thus obtained by high temperature reaction of materials including a mixture of magnesium and sodium vanadates activated with europium having empirical chemical formula:

$$(Mg_{1-y}Na_{1+y})_{1-x}Eu_x(VO_{4-y})_{1-z}F_yA_z$$

While several embodiments have been described, it is to be understood that the invention is not limited to the exact forms presented and that other variations may be made in the particular composition and materials without departing from the scope of the invention as set forth in the appended claims.

What is claimed is:
1. A composition of matter which is capable of fluorescence in the red and yellow regions of the visible spectrum under ultraviolet excitation having the empirical formula

$$(Mg_{1-y}Na_{1+y})_{1-x}Eu_x(VO_{4-y})_{1-z}F_yA_z$$

wherein A is selected from the group of materials consisting of a phosphate ion and an arsenate ion, the coefficient $x$ has a value greater than zero and less than 0.1, and the coefficients $y$ and $z$ have a value from zero to one.

2. The composition of claim 1 wherein $z=0$, $x=0.04$ and $y=0.2$.

3. The composition of claim 1 wherein $A=PO_4$, $x=0.04$, $y=0.2$ and $z=0.2$.

4. The composition of claim 1 wherein $A=AsO_4$, $x=0.04$, $y=0.2$ and $z=0.2$.

References Cited

UNITED STATES PATENTS

| | | | |
|---|---|---|---|
| 3,375,464 | 3/1968 | Brixner | 252—301.4 |
| 3,415,757 | 12/1968 | Wanmaker et al. | 252—301.4 |
| 3,417,027 | 12/1968 | Wanmaker et al. | 252—301.4 |

OTHER REFERENCES

Kroger—Some Aspects of the Luminescence of Solids, 1948, p. 285.

TOBIAS E. LEVOW, Primary Examiner
R. D. EDMONDS, Assistant Examiner